(12) United States Patent
Odate (10) Patent No.: US 7,698,037 B2
(45) Date of Patent: Apr. 13, 2010

(54) SEATBELT DEVICE FOR VEHICLE (75) Inventor: Shotaro Odate, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 342 days.

(21) Appl. No.: 11/774,287

(22) Filed: Jul. 6, 2007

(65) Prior Publication Data

US 2008/0017744 A1 Jan. 24, 2008

(30) Foreign Application Priority Data

Jul. 18, 2006 (JP) ............................. 2006-195819

(51) Int. Cl.
B60R 22/00 (2006.01)

(52) U.S. Cl. ................. 701/45; 701/1; 701/36; 180/268; 242/364; 242/370; 242/374; 242/389; 242/390.9; 280/806; 280/807; 280/808

(58) Field of Classification Search ........................ None
See application file for complete search history.

(56) References Cited

U.S. PATENT DOCUMENTS

| 3,986,093 | A | * | 10/1976 | Wakamatsu et al. ......... 318/484 |
|---|---|---|---|---|
| 4,552,319 | A | * | 11/1985 | Gavagan et al. ........... 242/382.2 |
| 5,552,986 | A | * | 9/1996 | Omura et al. .................. 701/45 |
| 6,116,696 | A | * | 9/2000 | Widman et al. ............. 297/483 |
| 6,343,759 | B1 | * | 2/2002 | Specht ..................... 242/375.1 |
| 6,598,821 | B2 | * | 7/2003 | Specht ........................ 242/374 |
| 6,676,056 | B2 | * | 1/2004 | Peter ........................... 242/374 |
| 6,997,474 | B2 | * | 2/2006 | Midorikawa et al. ......... 280/735 |
| 7,391,310 | B2 | * | 6/2008 | Ito et al. .................. 340/457.1 |
| 7,397,208 | B2 | * | 7/2008 | Tanaka et al. ................ 318/264 |
| 7,517,025 | B2 | * | 4/2009 | Tanaka et al. ................ 297/477 |
| 7,571,873 | B2 | * | 8/2009 | Takamatsu ............... 242/382.2 |
| 2002/0129986 | A1 | * | 9/2002 | Aoki .......................... 180/268 |
| 2003/0094534 | A1 | * | 5/2003 | Fujii et al. ................. 242/390.9 |
| 2003/0116669 | A1 | * | 6/2003 | Fujii et al. ................... 242/383 |
| 2004/0045757 | A1 | * | 3/2004 | Midorikawa et al. ......... 180/268 |
| 2004/0089758 | A1 | * | 5/2004 | Bullinger et al. ............. 242/374 |
| 2004/0195422 | A1 | * | 10/2004 | Fleischmann et al. ..... 242/382.2 |
| 2005/0017496 | A1 | * | 1/2005 | Stevens et al. .............. 280/806 |
| 2005/0139408 | A1 | * | 6/2005 | Bullinger et al. ............ 180/268 |
| 2005/0146128 | A1 | * | 7/2005 | Midorikawa et al. ......... 280/807 |
| 2005/0253012 | A1 | * | 11/2005 | Tanaka et al. ............. 242/390.9 |
| 2006/0047388 | A1 | * | 3/2006 | Oka et al. ...................... 701/41 |
| 2006/0113418 | A1 | * | 6/2006 | Nomura ...................... 242/374 |
| 2007/0085318 | A1 | * | 4/2007 | Stevens ....................... 280/806 |

FOREIGN PATENT DOCUMENTS

JP 2006-076390 3/2006

* cited by examiner

*Primary Examiner*—Khoi Tran
*Assistant Examiner*—Jonathan Sample
(74) *Attorney, Agent, or Firm*—Rankin, Hill & Clark LLP (57) ABSTRACT A seatbelt device for a vehicle includes a belt reel for winding a belt for restraining a target object, a motor for driving the rotation of the reel, and a control unit. The control unit determines whether the target object to be restrained is a child seat or a vehicle occupant on the basis of a winding position of the belt while no electricity is being supplied to the motor and the winding position of the belt when electricity is being supplied to the motor.

4 Claims, 8 Drawing Sheets

SEATBELT DEVICE FOR VEHICLE

FIELD OF THE INVENTION

The present invention relates to a seatbelt device for a vehicle and, more particularly, to a vehicular seatbelt device capable of determining whether a target object to be restrained by the seatbelt is a vehicle occupant or a child seat or other structural item.

BACKGROUND OF THE INVENTION

A vehicular seatbelt device restrains a vehicle occupant using a seatbelt when an emergency situation occurs in the vehicle or when travel conditions are unstable.

In recent years, regulations have been made stating that a child seat is to be used when a young child rides in a vehicle. Therefore, a demand exists for the aforedescribed type of seatbelt device for a vehicle that functions both in instances in which a vehicle occupant is to be restrained in the seat and instances in which a child seat is to be anchored to the seat. When a vehicle occupant is to be restrained, control must be made so that a degree of movement is allowed in normal driving conditions, and so that the restraint on the vehicle occupant is strengthened in the event of an emergency or when travel conditions are unstable. A child seat is itself a structural object and must therefore be attached to the seat and anchored by the belt before the vehicle travels. In such a situation, an assessment must be made as to whether the child seat is anchored to the seat. Such a seatbelt device is disclosed in JP-A-2006-76390.

Figure 9:
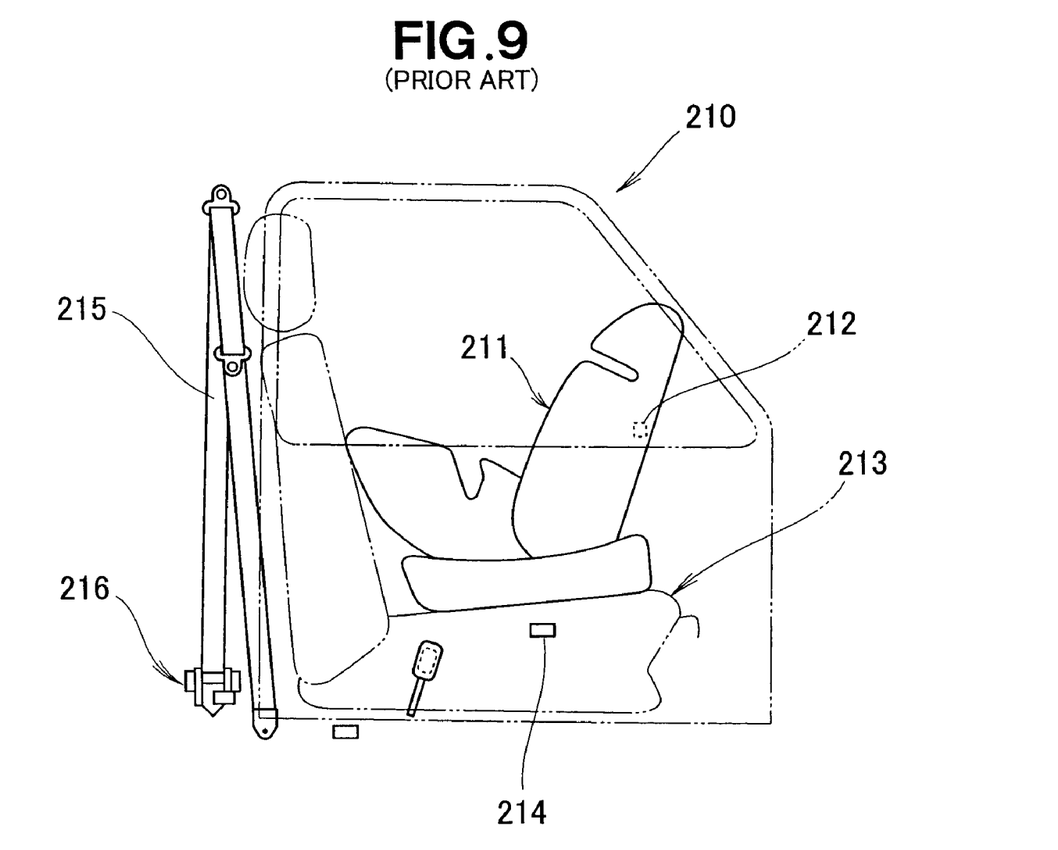
FIG. 9 is a schematic view showing a conventional seatbelt device.

FIG. 9 hereof shows a seatbelt device disclosed in JP-A-2006-76390, wherein a child seat is faced rearward and provided to a passenger's seat.

In a seatbelt device 210, a transceiving part 212 is provided to a child seat 211, and a transceiving part 214 for determining whether the child seat 211 has been installed is provided to a passenger's seat 213, as shown in FIG. 9. A belt 215 is wrapped around the child seat 211 mounted on the passenger's seat 213, a belt winding device 216 is then driven, and the child seat 211 is anchored by the belt 215. When an ignition key that is inserted into a cylinder of an ignition device is turned past an accessory (ACC) position, the belt winding device 216 is once again driven, and the child seat 211 is securely anchored by the belt.

However, in the seatbelt device 210, the transceiving parts 212, 214 are provided to detect the child seat 211, and are used to detect whether the child seat 211 is present. Merely providing a special sensor for simply detecting the installation of the child seat 211 in order to determine whether the child seat 211 has been installed may make it impossible to suitably anchor the child seat 211 when, for any of a variety of reasons, it cannot be accurately detected whether the child seat 211 is present.

It shall be apparent that the seat belt device is a device for restraining a vehicle occupant as well. Therefore, the seat belt device preferably can determine whether the installed object is a child seat or a vehicle occupant via the operation for restraining the child seat or the vehicle occupant using the belt. In particular, an accurate assessment preferably can be made.

In addition, when slackening or another change in the anchoring state occurs during travel due to any of a variety of reasons while the child seat is anchored, the anchoring state must be promptly returned to a proper state. When the anchoring item is determined to be a child seat, a seat belt device is desirably one that, in the event of an emergency, can issue a control to cancel the initiation of an airbag device or other devices that perform actions in relation to the vehicle occupant.

SUMMARY OF THE INVENTION

According to the present invention, there is provided a seatbelt device for a vehicle, which comprises: a belt for restraining a target object; an electric pretensioner composed of a belt reel for winding a belt, and a motor for driving the belt reel to retract the belt; winding position detection means for detecting a winding position of the belt reel; and a control unit for providing electricity to the motor using a predetermined method, wherein the control unit identifies the target object to be restrained by the belt, on the basis of the winding position of the belt reel while no electricity is being supplied to the motor, and on the basis of a winding position when electricity is being supplied to the motor.

For example, when the target object is a child seat, the child seat is a structural item. Therefore, small variations occur between the winding position (winding amount of the belt reel) while electricity is supplied and the winding position of the belt reel when electricity is not supplied. There is a degree of flexibility when the target object is a vehicle occupant. Therefore, variations will be great between the winding position (winding amount of the belt reel) when electricity is supplied and the winding position of the belt reel while electricity is not supplied. Therefore, the target object is identified on the basis of the winding position of the belt reel while electricity is not provided and the winding position when electricity is provided. A determination as to whether the target object is a child seat or a vehicle occupant can thereby be accurately made without the use of a sensor or the like for detecting a child seat.

Preferably, the motor performs a winding operation a plurality of times at a predetermined current value; and the control unit identifies the target object on the basis of variation in the winding position at various stages of winding.

When a winding operation is performed a plurality of times at a predetermined current value, when the target object is a child seat, decreases in the variation between the winding position at various stages of winding will be clearly evident. It will be determined that a child seat has been installed in a faulty manner when total variations in the winding position are greater than expected variations in the winding position. When the target object is a vehicle occupant, decreases in the variation in the winding position at various stages of winding will be less pronounced than when a child seat or another structural object (solid object) is installed. In other words, a winding operation is performed a plurality of times at a predetermined current value and the target object is identified on the basis of variations in the winding position at various stages of winding. The target object can thereby be accurately determined to be either a child seat or a vehicle occupant.

Desirably, the control unit identifies the target object on the basis of variation in the winding position and variation in the amount of electricity supplied to the motor.

For example, when no variation is evident in the winding position regardless of whether the amount of supplied electricity has increased, the target object is assumed to be a solid object (child seat). If variations in winding position are evident when the amount of electricity supplied is increased, the target object is assumed to be a flexible object (vehicle occupant). In other words, the target object is identified on the basis of variations in the winding position and variations in the amount of electricity supplied by utilizing the fact that there are differences in variations in the amount of electricity supplied to the motor in the different target objects. Therefore, the target object can be accurately determined to be either a child seat or a vehicle occupant. As a result, a differentiation between a child seat and a vehicle occupant can be made at an initial stage, and excessive pulling on the belt and excessive loads on the motor can be prevented.

Preferably, the control unit performs control so that the motor is windably driven until at least one value from among variation in the winding position and variation in the amount of electricity supplied to the motor has reached a predetermined state.

For example, when the target object is a child seat, the motor drives the winding until at least the variation in the winding position or the variation in the amount of supplied electricity reaches a predetermined state. Therefore, the child seat can be anchored at a proper tensile force, and instances of excessive loads being placed on the motor can be avoided.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

Figure 1:
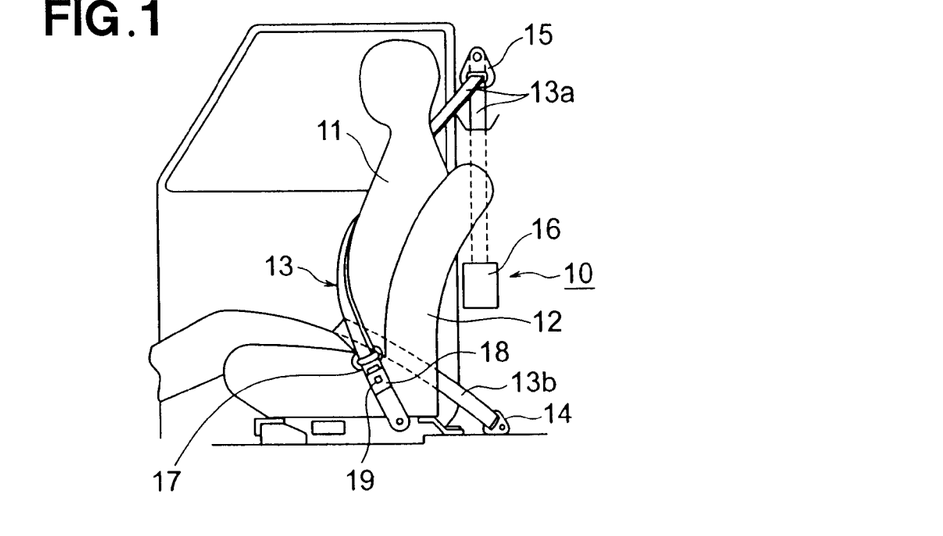
FIG. 1 is a side elevational view showing a state of installation of a seatbelt device according to an embodiment of the present invention.

In FIG. 1, a seat belt device 10 comprises a belt (webbing) 13 for restraining a body of a vehicle occupant 11 in a seat 12.

The belt 13 is comprised of an upper body restraining part 13a for restraining an upper body of the vehicle occupant 11, and a waist restraining part 13b for restraining a waist part of the vehicle occupant 11. One end of the waist restraining part 13b is anchored to a vehicle body portion of a lower part of a vehicle interior by an anchor plate 14. The upper body restraining part 13a is folded back by a through anchor 15 provided at a position in the vicinity of a shoulder region of the vehicle occupant 11. A base end part of the upper body restraining part is locked in a belt reel 22 (see FIG. 2) of a retractor 16. A tongue plate 17 is attached to a common end part on the other side of the belt 13. The tongue plate 17 can be attached to and removed from a buckle 18 anchored to a lower edge part of the seat 12. A buckle switch 19 for detecting the connection of the tongue plate 17 is provided to the buckle 18. When the tongue plate 17 is connected to the buckle 18 and locked, the buckle switch 19 is placed in an "on" state, and the vehicle occupant 11 is determined to be secured by the belt 13.

The seat 12 can move within the vehicle interior in a longitudinal direction of the vehicle body and is anchored at an arbitrary position within a range in which movement is allowed.

Figure 2:
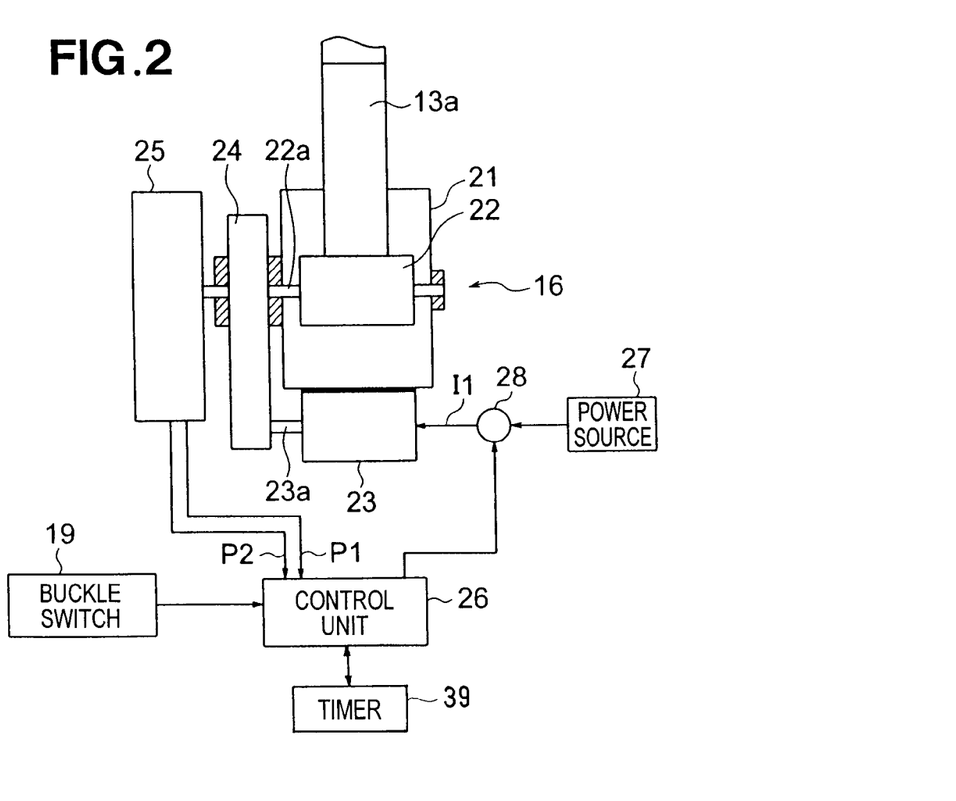
FIG. 2 is a diagrammatical view showing a retractor and a control unit of the seatbelt device shown in FIG. 1.

The retractor 16 comprises a belt reel (spindle) 22 rotatably provided in a housing 21, and a motor 23 for driving the rotation of the belt reel 22, as shown in FIG. 2. A base end part of the upper body belt part 13a is locked in the belt reel 22, and the belt part 13a is wound around an outer peripheral part of the belt reel 22.

A shaft 22a of the belt reel 22 is connected to a driving shaft 23a of the motor 23 via a movement transmitting mechanism (gear mechanism) 24. The rotation of the belt reel 22 is driven by the motor 23 via the movement transmitting mechanism 24. The retractor 16 further comprises a rotation detector 25 connected to the shaft 22a of the belt reel 22.

The rotation detector 25 is used to detect a winding position of the belt reel 22 and preferably comprises a rotation angle sensor. For example, a magnetism sensor composed of a combination of a magnetism disc and two Hall ICs is used for the rotation angle sensor. A minimum division angle of the rotation angle sensor is, e.g., 4° or, when converted to a length of the belt, about 1.3 to 1.6 mm.

Two pulse signals P1, P2 topologically staggered by a predetermined amount on the basis of the magnetism sensor are output from the rotation detector 25. The rotation direction (winding direction or pulling direction) of the shaft 22a of the belt reel 22 is detected on the basis of a phase created by the two pulse signals. A number of generated pulses is counted using either of the two pulse signals, whereby the rotation angle (degree of rotation) generated by the rotating action of the shaft 22a of the belt reel 22 can be detected. The rotation angle constitutes the degree of winding or pulling in the rotation direction.

The pulse signals P1, P2 output from the rotation detector 25 are input to a control unit 26. The control unit 26 calculates, on the basis of the two pulse signals P1, P2, e.g., the belt winding position, winding amount, and pulling amount associated with the belt reel 22.

In the seat belt device 10 of the present embodiment, the rotation detector 25 is used as a belt pulling amount detecting element for obtaining, in particular, the degree to which the belt is pulled.

The signals detected by the buckle switch 19 are input to the control unit 26.

The control unit 26 has a rotation angle calculating part and a rotation angle variation calculating part. A signal that relates to variations in the rotation angle obtained by the rotation angle variation calculating part is used as data for calculating, e.g., the movement of the belt 13 while the seat belt has been secured or variations in the degree to which the belt is pulled by the belt reel 22. The control unit 26 also obtains, on the basis of the signal relating to variations in the rotation angle, a belt winding position of the belt reel 22. The belt winding action of the retractor 16 is normally controlled by the control unit 26 on the basis of detection data relating to the belt winding position. A timer 39 counts the time required for the belt 13 to be retracted.

The control unit 26 controls an electricity amount adjusting part 28, whereby the amount of electricity of a driving current I1 provided to the motor 23 from a power source 27 is controlled, and the belt winding action of the retractor 16 is controlled. The retractor 16 controlled by the control unit 26 functions as an electric pretensioner for holding the position and orientation of the vehicle occupant 11. In other words, the electric pretensioner comprises the belt reel 22, the motor 23, and the rotational movement transmitting mechanism 24.

In the drawing, an example is shown in which the seat belt device 10 as well as the retractor 16 and other components included in the seat belt device are installed on a driver's seat. However, in the present embodiment, a similar seat belt device, retractor, and other components are also installed on a passenger's seat.

Figure 3A:
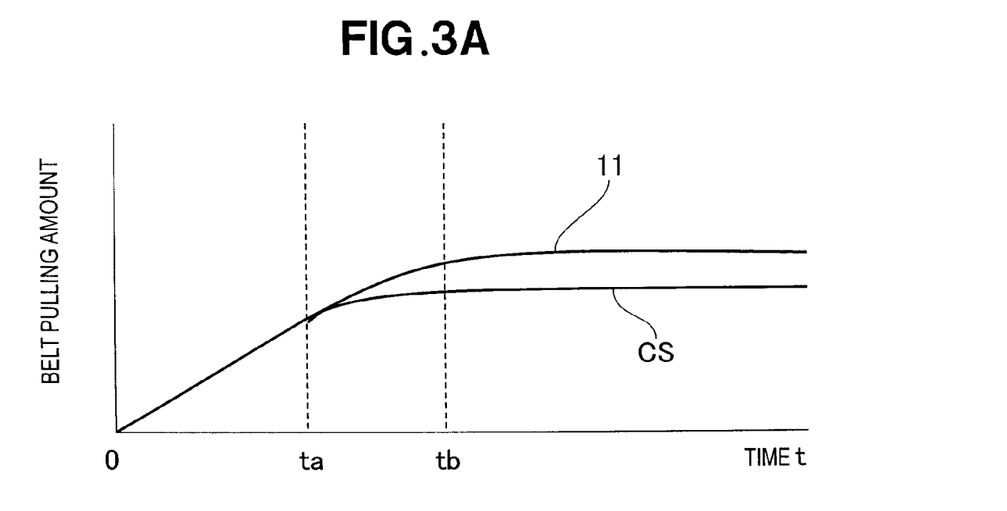
FIGS. 3A and 3B are graphs showing belt pulling amounts and motor currents in relation to time period during restraint of a target object by the seat belt of FIG. 1.
Figure 3B:
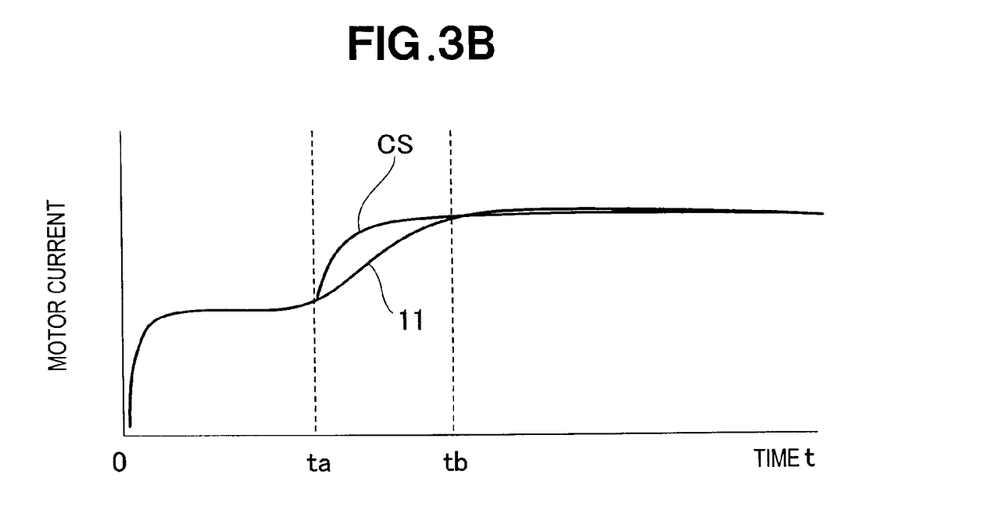

FIGS. 3A and 3B show graphs of belt pulling amount and motor current corresponding to a time during which a target object is restrained by the seat belt shown in FIG. 1.

When the object to be restrained by the belt 13 can be accurately determined to be either a child seat CS or the vehicle occupant 11, then if the object to be restrained by the belt 13 is the child seat CS, the child seat CS can be securely anchored by the belt 13. When the object to be restrained is the vehicle occupant, instances of unnecessary tensile force being applied can be prevented.

For example, when the object to be restrained by the belt is the child seat CS, it is believed that since the child seat CS is a structural object, small variations will occur between the winding position (winding amount of the belt reel 22) when electricity is supplied to the motor 23 and the winding position of the belt reel 22 when electricity is not supplied. When the target object to be restrained is the vehicle occupant 11, it is believed that since the object has a degree of flexibility, large variations will occur between the winding position (winding amount of the belt reel 22) when electricity is supplied to the motor 23 and the winding position of the belt reel 22 when electricity is not supplied.

In the graph of FIG. 3A, the target object to be restrained is the vehicle occupant 11 and the child seat CS. A horizontal axis indicates time t, and a vertical axis indicates a belt pulling amount. A range extending from where the time t exceeds 0 to ta is a time required until the belt 13 ceases to be slack. A range extending from where the time t exceeds ta to tb is a time during which the belt 13 is being pulled. A range exceeding the time tb is a time during which restraint is maintained.

In the range extending from where the time t exceeds 0 to ta, when an electric current of a predetermined pulse width is supplied to the motor 23 (referred to below as "fixed duty"), the belt pulling amount of the vehicle occupant 11 and child seat CS also increases over time in linear fashion.

The range extending from where the time t exceeds ta to tb is the time during which the belt 13 is being pulled. The belt pulling amount increases over time when the target object is the vehicle occupant 11. In contrast, the belt pulling amount is constant over time when the target object is the child seat CS. The vehicle occupant 11 is flexible and moves. Therefore, time is required for the belt pulling amount to reach a constant state. The child seat CS is a structural object (rigid body). Therefore, less time is required for the belt pulling amount to reach a constant state.

In the range exceeding the time tb, when the target object to be restrained is the vehicle occupant 11, the belt pulling amount moves toward a constant state. When the target object to be restrained is the child seat CS, the belt pulling amount is in a constant state. However, when the target object to be restrained is the vehicle occupant 11, it is evident that the degree to which the belt is pulled is greater than when the object is the child seat CS. As described above, the vehicle occupant 11 is flexible and moves. The child seat CS is a structural object. Therefore, the belt pulling amount is greater in the case of the vehicle occupant 11 than in the case of the child seat CS.

In FIG. 3B, the target object to be restrained is the vehicle occupant 11 and the child seat CS. A horizontal axis indicates time t, and a vertical axis indicates a motor current. A range extending from where the time t exceeds 0 to ta is a time required until the belt 13 ceases to be slack. A range extending from where the time t exceeds ta to tb is a time during which the belt 13 is being pulled. A range exceeding time tb is a time during which restraint is maintained.

In the range extending from where the time t exceeds 0 to ta, when electricity is supplied to the motor 23 at a fixed duty, the vehicle occupant 11 and child seat CS both instantaneously reach a constant current value and then become constant thereafter. In other words, the range extending from where the time t exceeds 0 to ta is a time during which the belt 13 ceases to be slack, and is based on the fact that the belt 13 is not subjected to a large load.

In the range extending from where the time t exceeds ta to tb, when the target object is the vehicle occupant 11, the current gradually increases. In contrast, when the target object is the child seat CS, the current rapidly increases. This indicates that, when the belt 13 is pulled in an instance where the target object is the vehicle occupant 11, the object is gradually restrained. In contrast, when the target object is the child seat CS, the object is restrained instantaneously. This difference also occurs due to the fact that the vehicle occupant 11 is flexible and can move, whereas the child seat CS is a structural object.

In the range exceeding the time tb, the current value is substantially constant both when the target object is the vehicle occupant 11 and when the target object is the child seat CS. This indicates that a predetermined tensile force of the belt has been placed on the vehicle occupant 11 and the child seat CS. In other words, the pulling amount and motor current (amount of variation in the current) will be different depending on whether the target object is the vehicle occupant 11 or the child seat CS. Therefore, these differences can be used to determine whether the target object is the vehicle occupant 11 or the child seat CS.

A control method of the control unit 26 shall be described below with reference to FIGS. 1 through 3 and on the basis of FIGS. 4 through 6.

Figure 4:
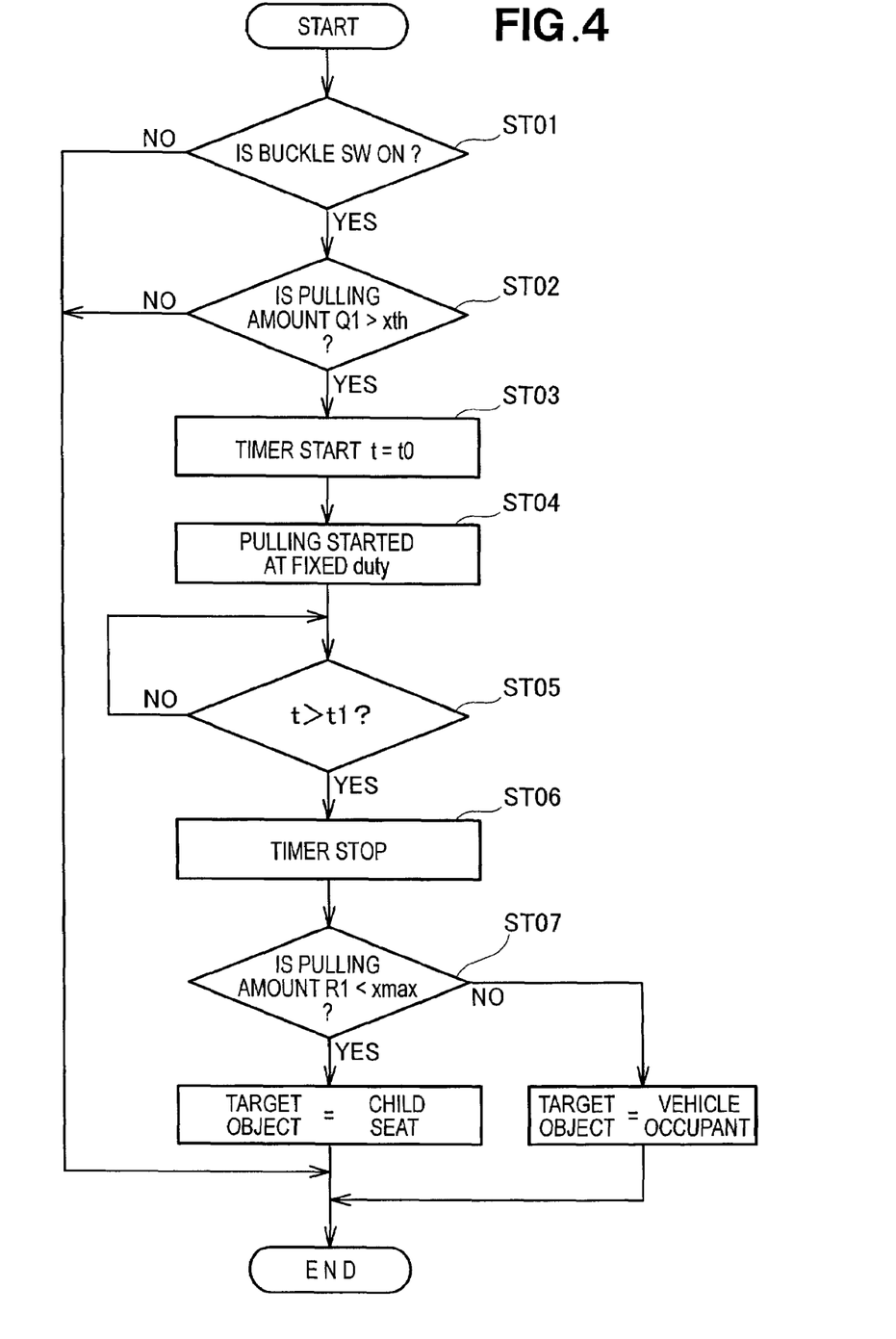
FIG. 4 is a flowchart of a first method for controlling the seatbelt device in which a target object is identified on the basis of a winding position of a belt reel when electricity is not supplied to a motor and a winding position when electricity is supplied.

FIG. 4 is a flowchart in which the target object is identified on the basis of a winding position of the belt reel 22 while electricity is not supplied to the motor and a winding position when electricity is supplied.

Step (hereafter abbreviated as "ST") 01: A decision is made as to whether the buckle switch 19 is ON. When YES, then the process proceeds to ST02. When NO, then the process is complete.

ST02: A decision is made as to whether a pulling amount Q1 of the belt 13 has exceeded a predetermined threshold value xth. When the pulling amount has not exceeded the threshold value xth, the buckle switch 19 is ON, but the belt 13 has been pulled in the absence of any object to be restrained. The pulling amount Q1 of the belt 13 is calculated by the control unit 26 on the basis of the data from the rotation detector 25. When YES, then the process proceeds to ST03. When NO, then the process is complete.

ST03: The timer 39 is started.

ST04: The belt 13 starts to be pulled at a fixed duty. In other words, a current of a predetermined pulse width is supplied to the motor 23.

ST05: A decision is made as to whether the timer 39 has exceeded a predetermined time t1 (t>t1). When YES, then the process proceeds to ST06. When NO, then ST05 is repeated.

ST06: The timer 39 is stopped.

ST07: A decision is made as to whether a pulling amount R1 is less than a predetermined threshold value xmax. When YES, then the target object is determined to be the child seat CS. When NO, then the target object is determined to be the vehicle occupant 11.

Therefore, a differentiation can accurately be made between the child seat CS and the vehicle occupant 11 without the use of a sensor or the like for detecting the child seat CS. As a result, the control system can be made simpler.

Figure 5:
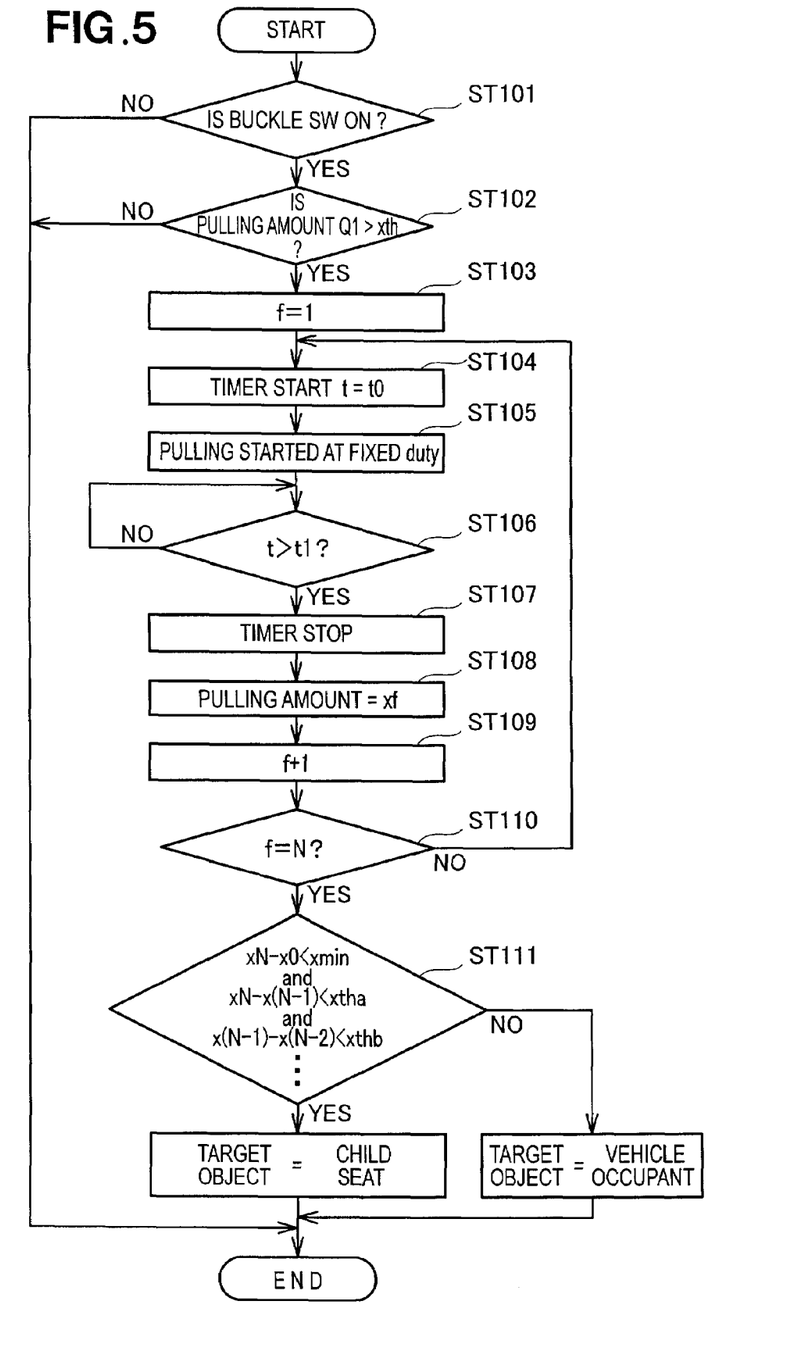
FIG. 5 is a flowchart of a second method for controlling the seatbelt device in which a winding operation is performed a plurality of times at a predetermined current value and a target object is identified on the basis of variations in the winding position at various stages of winding.

FIG. 5 shows a flowchart in which the belt reel is wound by the motor a plurality of times at a predetermined current value, and the target object is identified on the basis of variations in the winding position at various stages of winding.

When the winding operation is performed a plurality of times at the predetermined current value, and the target object to be restrained is a child seat, decreases will be clearly evident in the variation in the winding position at various stages of winding. For this reason, it can be determined that a child seat has been installed in a faulty manner when the total variation in the winding position is greater than the expected variation in the winding position. When the target object to be restrained is a vehicle occupant, the decreases in variation in the winding position at various stages of winding will be less pronounced than when a child seat or another structural object (solid object) is installed.

ST101: A decision is made as to whether the buckle switch 19 is ON. When YES, then the process proceeds to ST102. When NO, then the process is complete.

ST102: A decision is made as to whether the pulling amount Q1 of the belt 13 has exceeded the threshold value xth. The pulling amount Q1 of the belt 13 is calculated by the control unit 26 on the basis of data from the rotation detector 25. When YES, then the process proceeds to ST103. When NO, then the process is complete.

ST103: f is set at 1, where f is the pulling count. The pulling amount at this time is an initial pulling amount x0.

ST104: The timer is started.

ST105: The belt 13 starts to be pulled at a fixed duty. In other words, a current of a predetermined pulse width is supplied to the motor 23.

ST106: A decision is made as to whether the timer has exceeded the time t1 (t>t1). When YES, then the process proceeds to ST107. When NO, then ST106 is repeated.

ST107: The timer is stopped.

ST108: A pulling amount xf at a count of f is calculated.

ST109: The pulling count f is increased by 1 to become f+1.

ST110: A decision is made as to whether pulling count f has reached a count of N. When YES, then the process proceeds to ST111. When NO, then the process returns to ST104.

ST111: A decision is made as to whether (xN−x0), which is a difference between a pulling amount xN when the pulling count is N and the initial pulling amount x0, is less than a threshold value xmin; whether [xN−x(N−1)], which is a difference between the pulling amount xN when the pulling count is N and a pulling amount x(N−1) at a count (N−1) that is one count before when the pulling count is N, is less than a threshold value xtha; and whether [x(N−1)−x(N−2)], which is a difference between the pulling amount x(N−1) at the count (N−1) that is one count before when the pulling count is N and a pulling amount x(N−2) that is two counts before when the pulling count is N, is less than a threshold value xthb.

For example, if the pulling operation is performed three times, a decision is made as to whether a value obtained by subtracting the initial pulling amount x0 from the third pulling amount (an actual pulling amount) is less than the threshold value xmin. When the value is less than the threshold value, the target object is determined to be the child seat CS. When the value is less than the threshold value, the target object is determined to be the child seat CS. It is determined either that the target object is the vehicle occupant 11 or that there may be some looseness in the anchoring of the child seat CS when the value exceeds the threshold value xmin. These evaluations are performed for each pulling count.

When the target object is the child seat CS, the object is a structural object (rigid body). Therefore, it is believed that the difference between the pulling values for each pulling count will be small. A decision is accordingly made as to whether a value obtained by subtracting a second pulling amount from the third pulling amount is less than the threshold value xtha. A decision is also made as to whether a value obtained by subtracting a first pulling amount (the initial pulling amount) from the second pulling amount is less than the threshold value xthb. When YES, then the target object is determined to be the child seat CS. When NO, then the target object is determined to be the vehicle occupant 11.

Thus, the belt is wound a plurality of times at the predetermined current value, and, since there are differences in variations in the winding position at various stages of winding, the target object is identified on the basis of variations in the winding position at various stages of winding. Therefore, the target object can be accurately determined to be either the child seat CS or the vehicle occupant 11.

Figure 6:
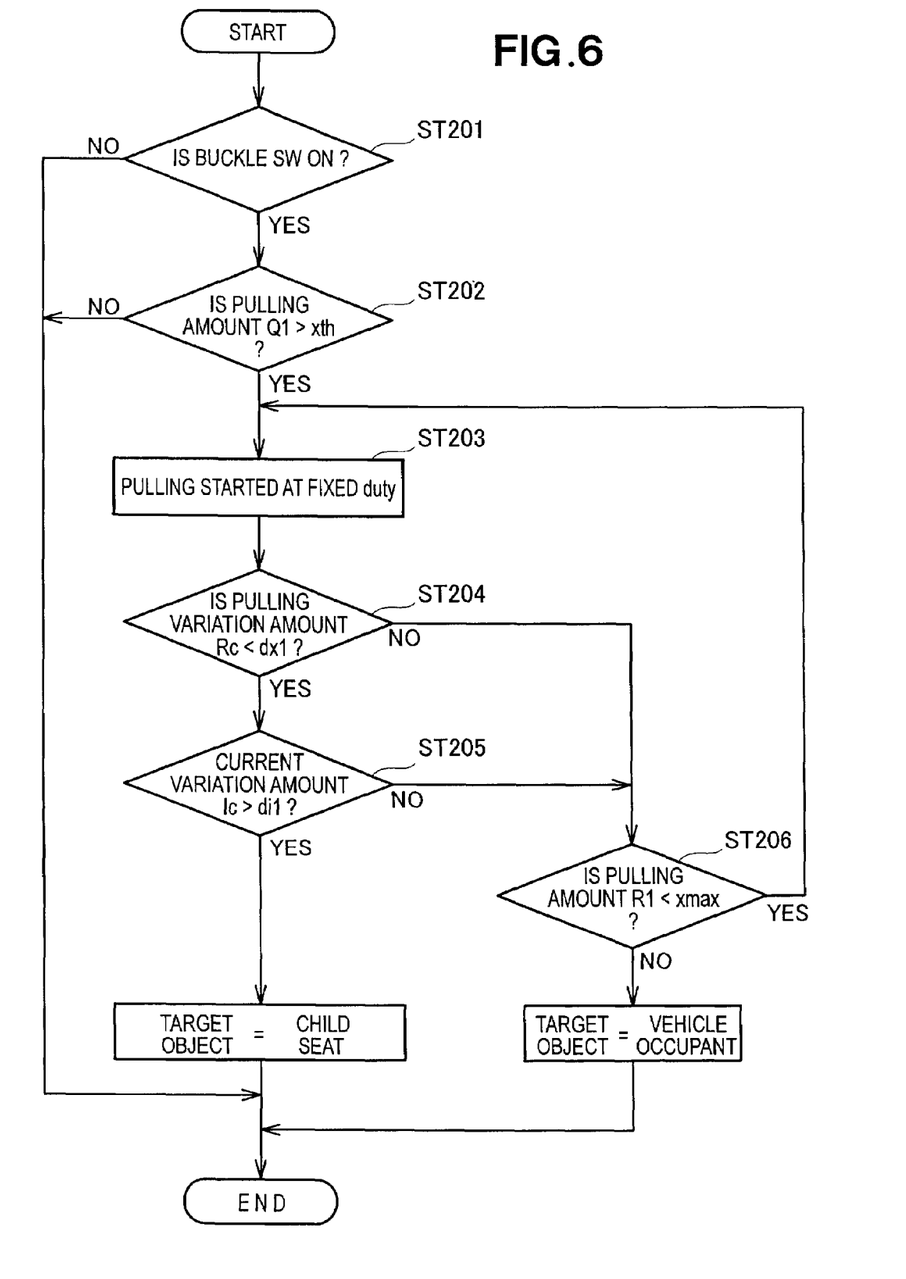
FIG. 6 is a flowchart of a third method for controlling the seatbelt device in which a target object is identified on the basis of variation in the winding position and variation in the amount of electricity supplied.

FIG. 6 shows a flowchart in which the target object is identified on the basis of variations in the winding position of the belt and variations in the amount of electricity supplied to the motor.

For example, when no variation is evident in the winding position regardless of whether the amount of supplied electricity has increased, the target object is assumed to be a solid object (child seat). If variations in winding position are evident when the amount of electricity supplied is increased, the target object is assumed to be a flexible object (vehicle occupant).

ST201: A decision is made as to whether the buckle switch 19 is ON. When YES, then the process proceeds to ST202. When NO, then the process is complete.

ST202: A decision is made as to whether the pulling amount Q1 of the belt 13 has exceeded the threshold value xth. The pulling amount Q1 of the belt 13 is calculated by the control unit 26 on the basis of the data from the rotation detector 25. If YES, then the process proceeds to ST203. When NO, then the process is complete.

ST203: The belt 13 starts to be pulled at a fixed duty. In other words, a current of a predetermined pulse width is supplied to the motor 23.

ST204: A decision is made as to whether an amount of variation RC in the pulling of the belt 13 is less than a predetermined threshold value dx1. When YES, then the process proceeds to ST205. When NO, then the process proceeds to ST206.

ST205: A decision is made as to whether an amount of variation Ic in the current of the motor 23 has exceeded a predetermined threshold value di1. When YES, then the target object is determined to be the child seat CS. When NO, then the process proceeds to ST206.

ST206: A decision is made as to whether a pulling amount R1 is less than the predetermined threshold value xmax. When YES, then a decision is made that [the belt] has not yet been sufficiently pulled, and the process returns to ST203. When NO, then the target object is determined to be the vehicle occupant 11.

Thus, the target object is identified on the basis of variations in the winding position of the belt and variations in the amount of electricity supplied to the motor because the different target objects exhibit different variations in the amount of electricity supplied. Therefore, the target object can be accurately determined to be either the child seat CS or the vehicle occupant 11. As a result, the target object can be determined to be either the child seat CS or the vehicle occupant 11 at an initial stage, and instances of the belt 13 being pulled excessively and of an excessive load being placed on the motor 23 can be prevented.

When the target object is determined to be the child seat CS, the motor 23 performs a winding operation until at least one value from among variation in the winding position of the belt (variation in the detection angle of the rotation detector 25 shown in FIG. 2) and variation in the amount of electricity supplied (variation in the current of the motor shown in FIG. 3) has reached a predetermined state. As a result, the child seat CS can be anchored at a proper tensile force.

Figure 7:
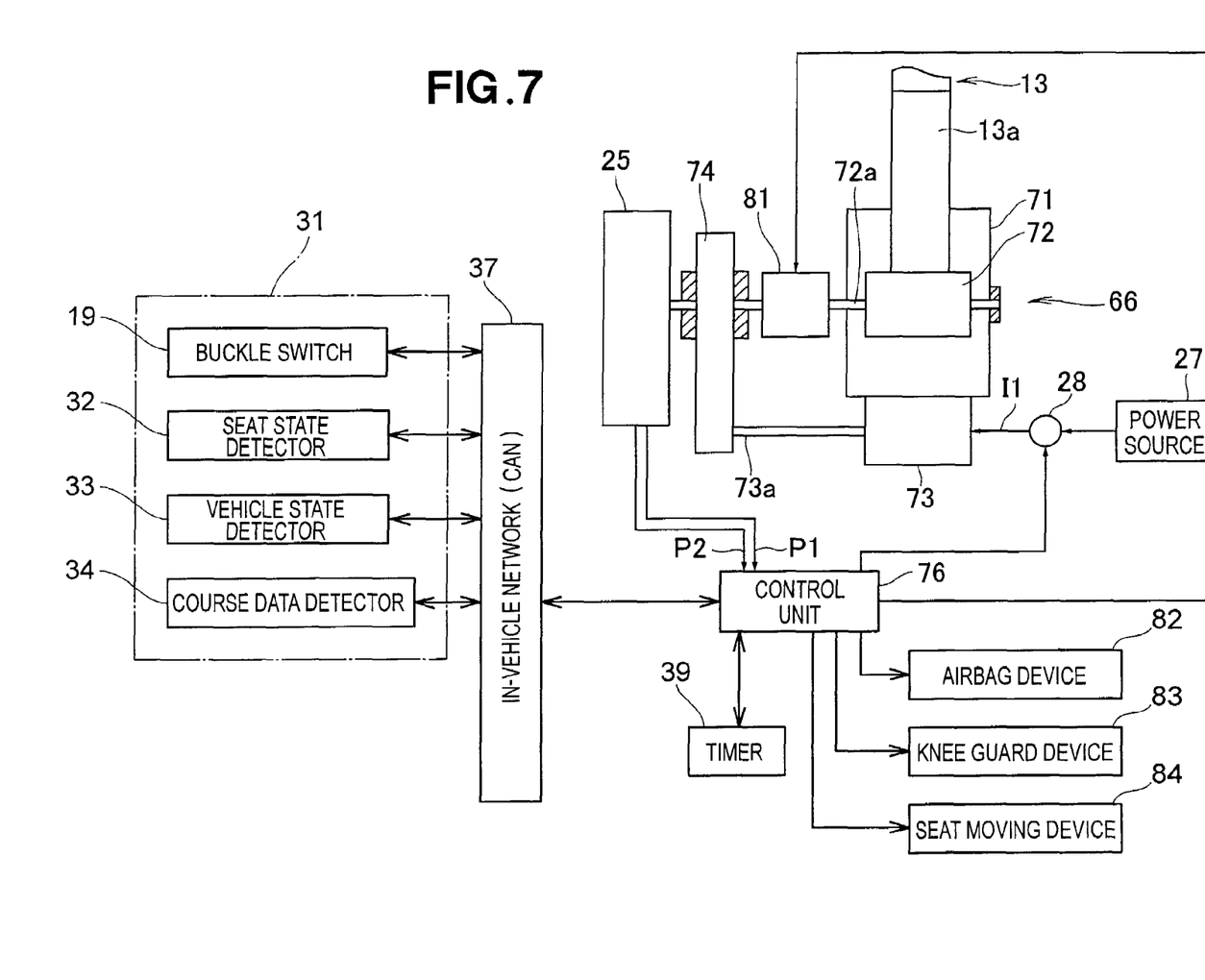
FIG. 7 is an electrical block diagram of a seatbelt device according to a separate embodiment.

FIG. 7 shows an electrical block diagram of a seatbelt device of another embodiment. The same reference symbols are used to indicate components that are the same as those of the seatbelt device of the embodiment shown in FIGS. 1 and 2, and detailed descriptions thereof shall be omitted accordingly.

A retractor 66 shown in FIG. 7 comprises a belt reel 72 rotatably provided in a housing 71, and a motor 73 for driving the rotation of the belt reel 72.

A base end part of an upper body restraining part 13a of a belt 13 for restraining the upper body of the vehicle occupant is locked in the belt reel 72. The upper body restraining part 13a is wound around the belt reel 72. A shaft 72a of the belt reel 72 is connected to an explosion-type winding mechanism 81, and is connected to a drive shaft 73a of the motor 73 via a movement transmitting mechanism (gear mechanism) 74.

The rotation of the belt reel 72 is driven by the explosion-type winding mechanism 81 or is driven by the motor 73 via the movement transmitting mechanism 74.

The retractor 66 comprises a rotation detector 25 connected to the shaft 72a of the belt reel 72.

A detecting means 31 is composed of a buckle switch 19, a seat state detector 32, a vehicle state detector 33, and a course data detector 34. The detecting means is connected to an in-vehicle network (CAN) 37.

The seat state detector 32 detects a seat state from, e.g., a vehicle occupant sensor, weight sensor, seat positioning sensor, and a reclining sensor.

The vehicle state detector 33 detects a vehicle state from, e.g., an acceleration sensor, a vehicle speed sensor, a rollover sensor (rolling sensor), a yaw rate sensor, a steering angle sensor for detecting a steering angle, an accelerator depression amount sensor for detecting the amount in which an accelerator pedal is depressed, and a brake depression amount sensor for selecting an amount in which a brake pedal is depressed.

The course data detector 34 detects data related to a travel course from, e.g., a navigation system (NAVI), a radar, a vehicle information and communication system (VICS), and night vision.

The in-vehicle network 37 is connected to a control unit 76.

When the target object to be restrained by the belt is determined to be the child seat CS, the control unit 76 performs controls on the basis of data from the seat state detector 32, vehicle state detector 33, and the route data detector 34 to stop (cut off) the operation of the explosion-type winding mechanism 81; an airbag device 82 that includes front, rear, left, and right airbags; a knee guard device 83 for guarding the knees of the vehicle occupant 11 (FIG. 1), and a seat moving device 84 for sliding a vehicle seat forward and backward. The control unit 76 also performs controls so that the explosion-type winding mechanism 81 will restrain the vehicle occupant 11 when the target object is determined to be the vehicle occupant 11 and the vehicle is in a state of emergency.

The timer 39 counts the time required for the belt 13 to be retracted. In the retractor 66, the belt reel 72, explosion-type winding mechanism 81, motor 73, and movement transmitting mechanism 74 constitute an explosion-type/electric pretensioner.

The VICS is a system capable of obtaining road information, such as traffic information and regulatory information relating to the road, in real time while in the vehicle.

The navigation is a system that shows a route during night-time travel using a far infrared camera or the like, detects obstacles or the like on the travel route, and notifies the vehicle occupant 11.

Figure 8:
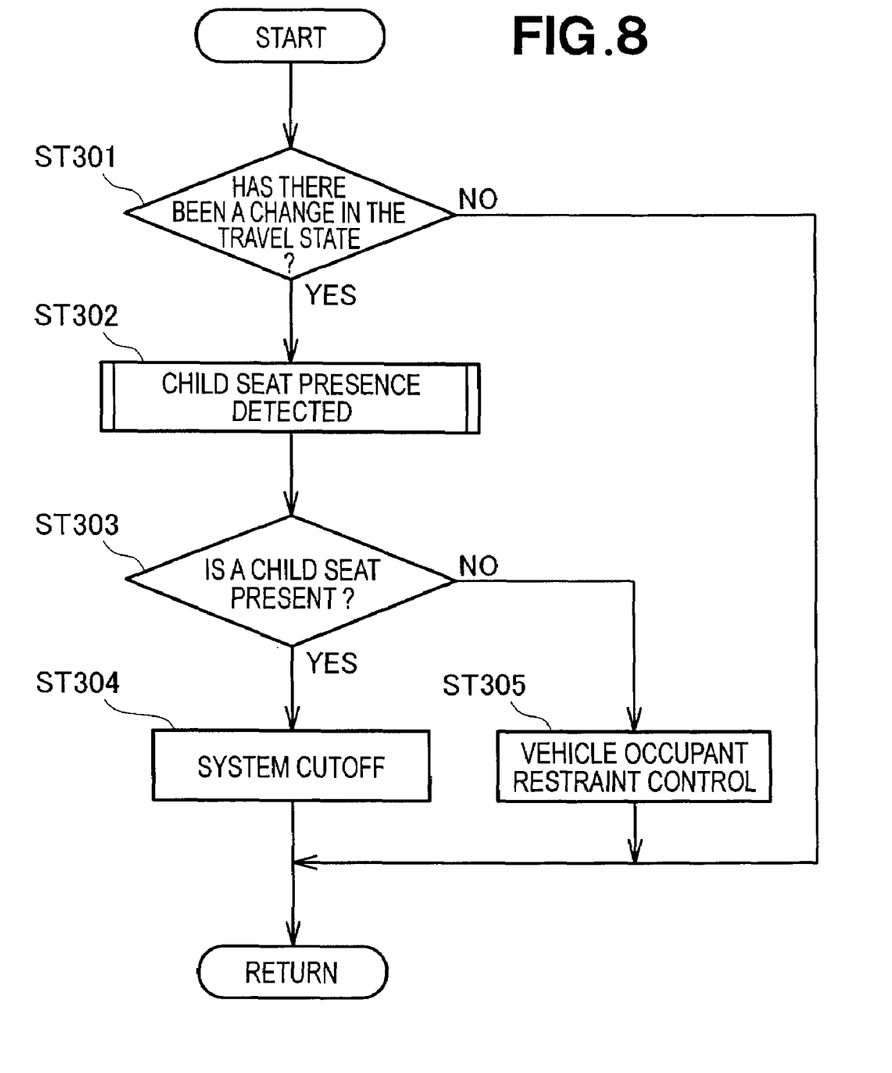
FIG. 8 is a flowchart of a control unit shown in FIG. 7.

FIG. 8 is a flowchart showing a control method of the control unit 76 shown in FIG. 7.

ST301: A decision is made as to whether there has been a change in the travel state of the vehicle. When YES, then process proceeds to ST302. When NO, then the process is complete.

ST302: The presence or absence of the child seat CS is detected.

ST303: A decision is made as to whether the child seat CS is present. In other words, it is determined whether the target object is the vehicle occupant 11 or the child seat CS. This decision is made using the method in the flowchart of any of FIGS. 4 through 6. When YES, then the process proceeds to ST304. When NO, then the process proceeds to ST305.

ST304: Operations of the explosion-type winding mechanism 81, airbag device 82, knee guard device 83, seat moving device 84, and other systems are stopped (cut off).

ST305: Restraint of the vehicle occupant 11 is controlled by the motor 73 or the explosion-type winding mechanism 81.

As shown in FIGS. 4 and 5, the seatbelt device of the present embodiment only determines whether the object to be mounted is the child seat CS or the vehicle occupant 11. However, the present embodiment is not limited to this function. When the target object is determined to be the child seat CS, the winding of the motor 23 may be driven until at least one value from among variation in the winding position (variations in the detection angle of the rotation detector 25 shown in FIG. 2) and variation in the amount of electricity supplied (variations in the current of the motor shown in FIG. 3) has reached a predetermined state. As a result, the child seat CS can be anchored at a proper tensile force.

The winding of the motor may be suitably driven again when at least the variation in the winding position or the variation in the amount of electricity supplied is detected while the vehicle is traveling.

As shown in FIG. 8, in the seatbelt device of the present embodiment, the presence of the child seat CS is determined in ST302 and ST303. However, the presence of the child seat CS may be determined as a part of the operation for controlling the restraining of the vehicle occupant 11 in ST305.

In the embodiment shown in FIG. 8, the operations of the explosion-type winding mechanism 81, airbag device 82, knee guard device 83, and seat moving device 84 are stopped (cut off). However, these systems are presented as examples, and the operations of more or fewer components can be suitably cut off.

The seatbelt device of the present invention is suitable for use in a sedan, wagon, or other passenger vehicle.

Obviously, various minor changes and modifications of the present invention are possible in light of the above teaching. It is therefore to be understood that within the scope of the appended claims the invention may be practiced otherwise than as specifically described.

What is claimed is:

1. A seatbelt device for a vehicle, comprising:
   a belt for restraining a target object;
   an electric pretensioner comprised of a belt reel for winding a belt, and a motor for driving the belt reel to retract the belt;
   winding position detection means for detecting a winding position of the belt reel; and
   a control unit for providing electricity to the motor using a predetermined method,
   wherein the control unit identifies the target object to be restrained by the belt, on the basis of the winding position of the belt reel while no electricity is being supplied to the motor, and on the basis of a winding position when electricity is being supplied to the motor.

2. The seatbelt device of claim 1, wherein the motor performs a winding operation a plurality of times at a predetermined current value, and the control unit identifies the target object on the basis of variation in the winding position at various stages of winding.

3. The seatbelt device of claim 1, wherein the control unit identifies the target object on the basis of variation in the winding position and variation in the amount of electricity supplied to the motor.

4. The seatbelt device of claim 1, wherein the control unit performs control so that the motor is windably driven until at least one value from among a variation in the winding position and a variation in the amount of electricity supplied to the motor has reached a predetermined state.

* * * * *